United States Patent
Maughan et al.

(10) Patent No.: US 6,550,120 B1
(45) Date of Patent: Apr. 22, 2003

(54) THREADED CONVERSION KIT FOR REPLACEMENT BALL JOINTS

(75) Inventors: Garth B. Maughan, Delta, OH (US); Wayne M. Winkler, Berkey, OH (US); Anthony S. Szumiesz, Lambertville, MI (US)

(73) Assignee: Dana Corporation, Toledo, OH (US)

( * ) Notice: Subject to any disclaimer, the term of this patent is extended or adjusted under 35 U.S.C. 154(b) by 120 days.

(21) Appl. No.: 09/828,063

(22) Filed: Apr. 5, 2001

(51) Int. Cl.[7] .................................................. B23P 6/00
(52) U.S. Cl. ................ 29/401.1; 29/402.06; 29/402.08; 29/271; 29/898.07; 29/898.43; 408/199; 408/208; 408/200; 470/198; 403/118
(58) Field of Search ........................ 29/898.043, 401.1, 29/402.06, 402.08, 557, 270, 271, 281, 898.07; 408/215, 216, 208, 241 G, 199, 200, 202; 269/287, 288; 470/198; 403/118

(56) References Cited

U.S. PATENT DOCUMENTS

| | | | |
|---|---|---|---|
| 2,848,260 A | | 8/1958 | Moskovitz |
| 3,017,643 A | * | 1/1962 | Lehde, Jr. |
| 3,131,583 A | * | 5/1964 | Hanley et al. |
| 3,202,444 A | * | 8/1965 | Rowlett |
| 3,305,281 A | | 2/1967 | Dumpis |
| 3,535,956 A | * | 10/1970 | Gnoth |
| 3,650,004 A | | 3/1972 | Bergstrom |
| 4,568,216 A | | 2/1986 | Mizusawa et al. |
| 4,613,250 A | | 9/1986 | Laucus |
| 5,733,077 A | * | 3/1998 | MacIntosh, Jr. |
| 5,799,968 A | | 9/1998 | Loeffler |
| 6,053,079 A | | 4/2000 | Sokol et al. |

\* cited by examiner

Primary Examiner—Gregory M. Vidovich
Assistant Examiner—Eric Compton
(74) Attorney, Agent, or Firm—Rader, Fishman & Grauer PLLC

(57) ABSTRACT

An aftermarket retrofit kit is used to prepare control arm bosses of automotive suspension systems to receive new, replacement ball joints. The kit includes a special cutting tool for forming obtuse threads in the apertures of aluminum suspension system mounting bosses for replacement of spent or used steel ball joints originally pressed-fit into forged aluminum control and steering arms. Since unthreaded apertures of bosses of control and steering arm joints in which the original pressed fitted equipment ball joints may be threaded to receive the new joints, avoidance of having to replace expensive original control and steering arms is made possible by the reuse of such arm parts normally discarded. A separate alignment block is included to assure accurate piloting of the cutting tool. Threading of the control arm bosses can be done on or off of the vehicle, and separate kits are provided for upper and lower control arms.

13 Claims, 6 Drawing Sheets

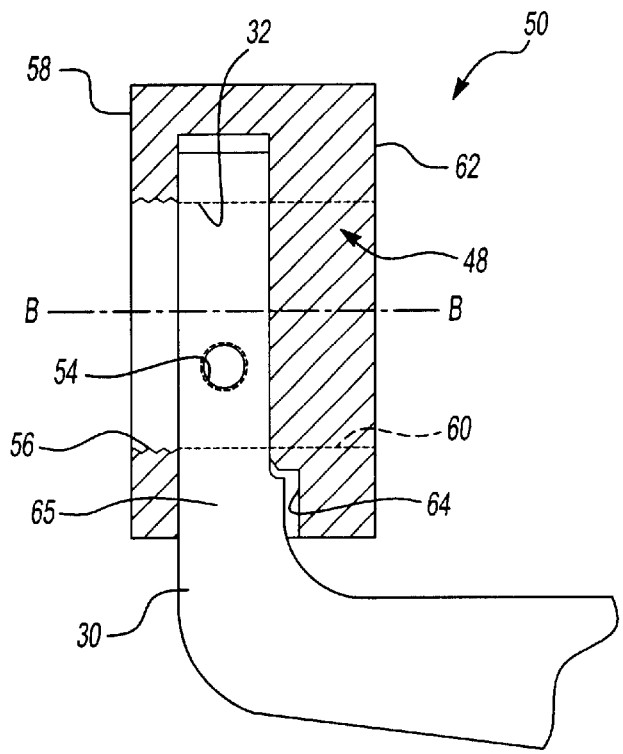
*Fig-7*
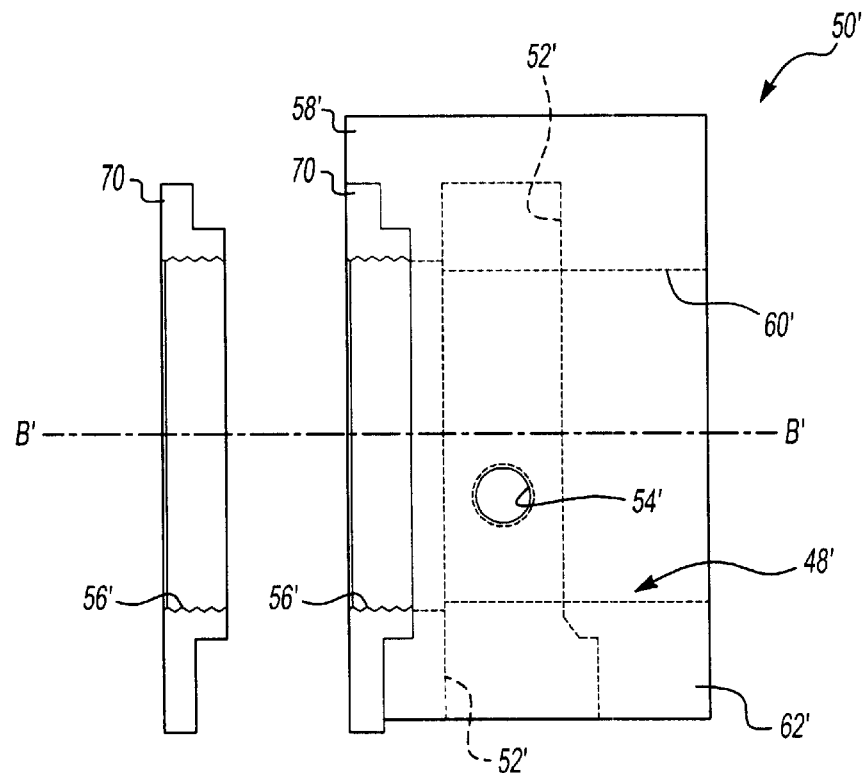
*Fig-8B*  *Fig-8A*

THREADED CONVERSION KIT FOR REPLACEMENT BALL JOINTS

BACKGROUND OF THE INVENTION

1. Field of Invention

The present invention relates to ball joints used in suspension systems of automotive vehicles, and particularly to kits for facilitating field conversion of original equipment unthreaded press-fit ball joints into threaded replacement ball joint structures.

2. Description of the Prior Art

Those skilled in the art will appreciate issues related to replacing worn out original equipment press-fit style ball joints in upper and lower control arms, as well as in steering arms, of automotive vehicles. Usually in the replacement of press-fit style ball joints, not only is the joint replaced; typical requirements call for the associated mating boss part to be replaced as well. Such replacements are relatively expensive, particularly in the operation of racing vehicles, wherein excess loads are the norm, and commensurately short ball joint life cycles give rise to frequent replacements.

As one example involving certain late model Chevrolet Corvette suspension systems, the ball joints are formed of steel materials, while associated bosses of the control arms are formed of aluminum materials. The original equipment steel ball joint is press-fitted into the aluminum boss of the control arm. For safety reasons, the standard recommendation by General Motors Corporation, the maker of the Corvette, is against the reuse of any used aluminum part, notwithstanding expense. Thus, the replacement of both the worn ball joints as well as of their mating aluminum parts has become standard operating procedure, as well as a high expense with respect to such vehicles involved in racing activity.

SUMMARY OF THE INVENTION

The present invention provides an aftermarket retrofit kit for accommodating securement of threaded replacement steel ball joints in original equipment unthreaded apertures of aluminum bosses of control and steering arm joints in which original unthreaded ball joints were pressed-fitted. The kit is used to thread the original equipment boss apertures, and thus facilitates avoidance of having to replace original equipment aluminum control and steering arms. As such, the kit provides an opportunity to reuse the aluminum control and steering arm parts that would otherwise be discarded.

In a preferred form, the kit provides a cutting tool for creating preferably obtuse threads into and through the apertures of the original equipment aluminum mounting bosses. The kit is particularly designed for replacement of steel ball joints that have been pressed-fit into originally provided forged aluminum control and steering arm bosses, although not necessarily limited to those specific materials. To the extent that part sizes differ, separate kits can be use for respective upper and lower control arm ball joint systems.

In a preferred form, the aftermarket threaded replacement ball joints feature self-tapping threads, making possible (e.g. for some low risk applications) the reuse of previously kit-threaded aluminum mating parts for installation of successive replacement ball joints. Finally, in-the-field threading of the control arm bosses can be done on or off of the vehicle.

BRIEF DESCRIPTION OF THE DRAWINGS

FIG. 7 is a cross-sectional view of the alignment tool of FIG. 6 shown installed over an inverted aluminum boss of the style depicted in FIG. 4.

FIG. 8A is a side view of a second embodiment of an alignment tool of the present invention; FIG. 8B shows an insert adapted to be received in said embodiment.

DETAILED DESCRIPTION OF THE PREFERRED EMBODIMENTS

Figure 1:
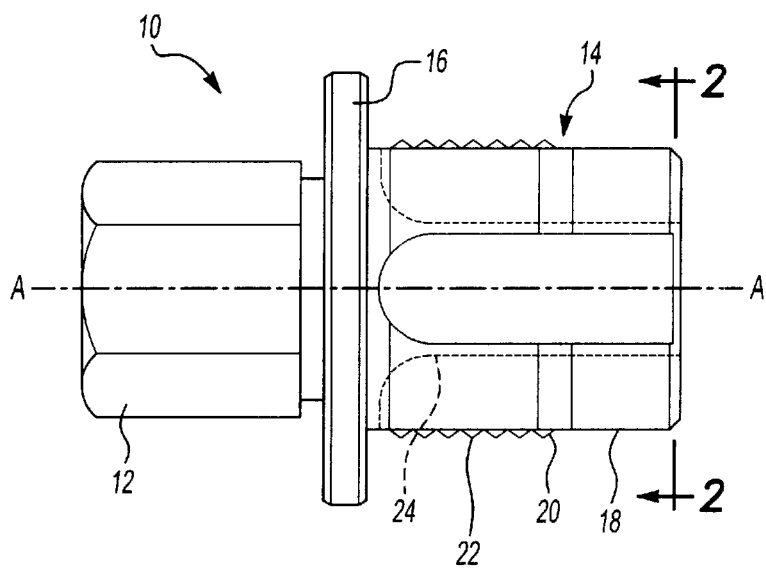
FIG. 1 is a side view of one preferred embodiment of a cutting tool provided in the kit of the present invention.
Figure 2:
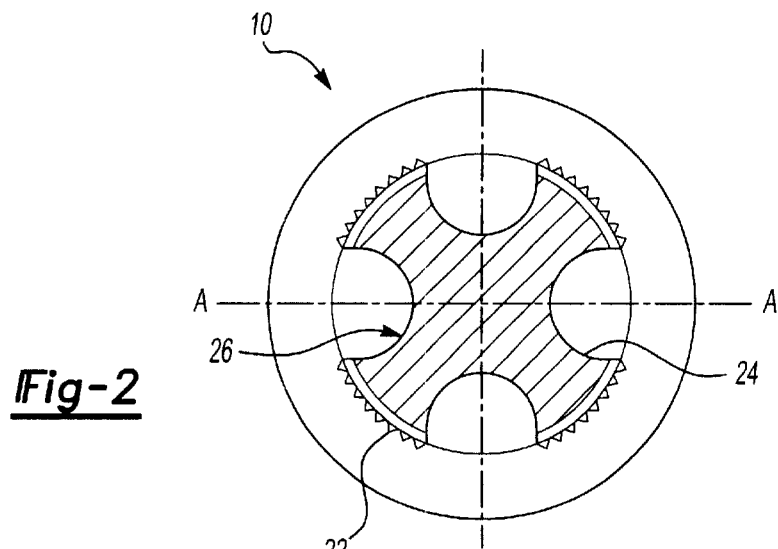
FIG. 2 is an end view of the cutting tool of FIG. 1, shown along lines 2—2 of FIG. 1.

Referring initially to FIGS. 1–4, a preferred embodiment of a rotary tap or cutting tool 10 is defined by an elongated cylindrical body having an axis a—a. The tool 10, as part of an earlier described reusable ball joint flange boss conversion kit, is adapted to be manually rotated via hexagonal socket nut 12 positioned at one end. The opposite end 14 of the tool 10 is a cutting end, adapted for creating a screw thread in an aperture 32 of a flange-style boss 30 (FIG. 4) in a manner to be described.

The tool 10 further incorporates a stop ring 16 situated between the hexagonal socket nut 12 and the cutting end 14 thereof for limiting amount of advance of the tool 10 through the aperture 32. A pilot end portion 18 is adapted to be inserted into one end of an alignment block 50 (FIGS. 6–8) as will be hereinafter described.

Contiguous with the pilot end 18 is a tapered lead-in thread portion 20, which in turn is contiguous with a male cutting thread 22 adapted to cut a screw thread into the boss aperture 32. Those skilled in the art will appreciate the inclusion of fluted cutting edges 24 in the cutting end 14 of the tool 10 to assure state-of-the-art efficiency. Associated with the fluted cutting edges 24 are fluted relief concavities 26 adapted to accommodate metals chips during the cutting of the screw thread in the boss aperture 32.

Figure 3:
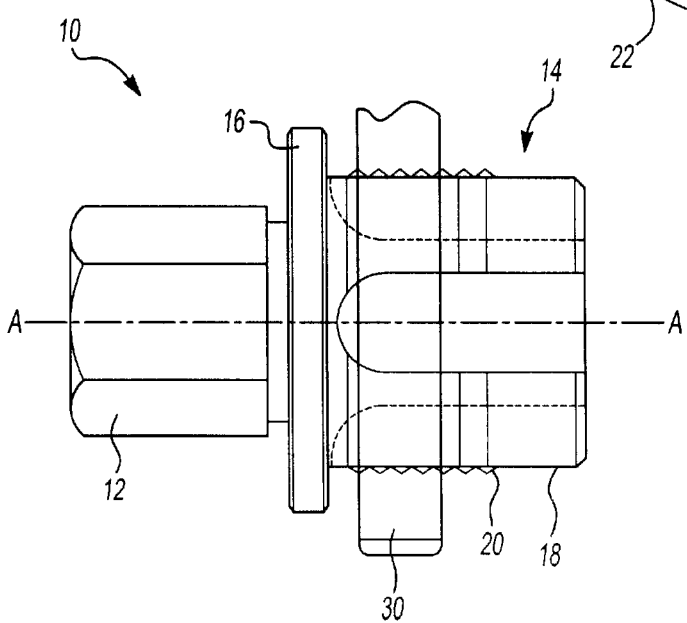
FIG. 3 is another side view of the same preferred embodiment of the cutting tool of FIG. 1, shown in the process of cutting an obtuse thread into an aperture of an aluminum boss.
Figure 4:
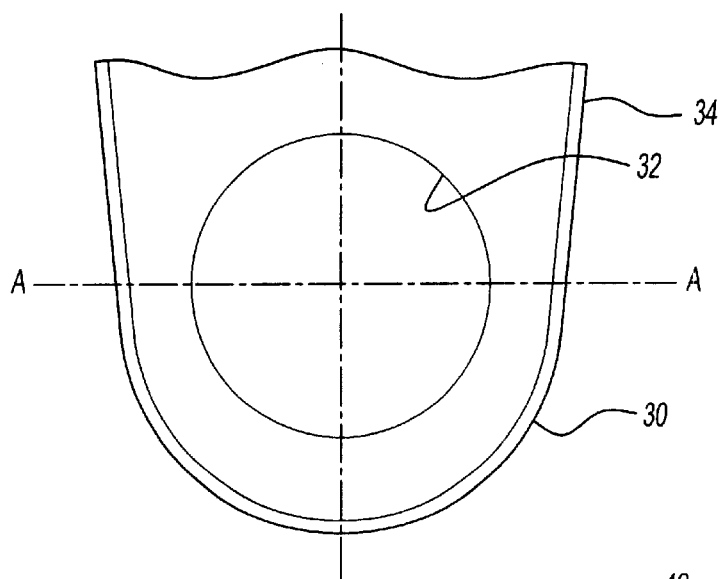
FIG. 4 is an elevation view of a flange style aluminum boss without a threaded aperture, prior to the application of the cutting tool as shown in FIG. 3.

Referring now particularly to FIGS. 3 and 4, a control arm boss 30 as appreciated by those skilled in the art to be part of a vehicular suspension system, is of the flange style type as shown. The aperture 32, which passes therethrough, is unthreaded, having been previously adapted to receive a press fit style ball joint as original equipment. Typically, the boss 30 and its associated control arm are formed of forged aluminum material. The cutting tool 10, on the other hand, is formed of high strength tool steel for appropriate cutting ability relative to the softer aluminum material.

Figure 5:
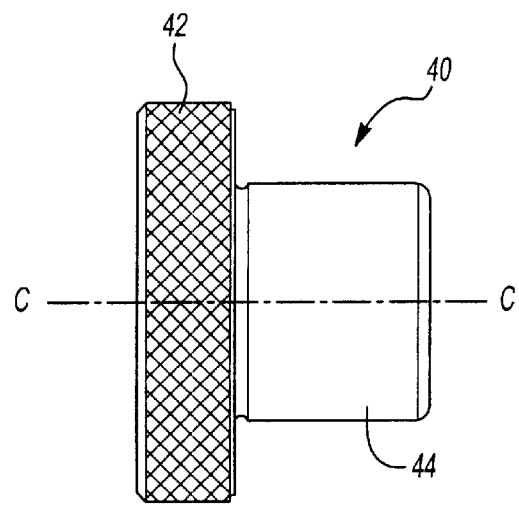
FIG. 5 is a side view of a locator tool provided in the preferred embodiment of the present invention.
Figure 6:
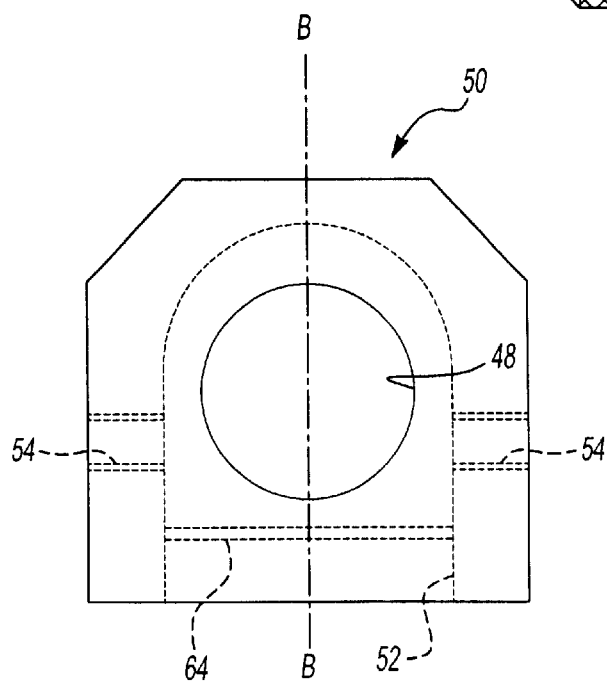
FIG. 6 is a frontal view of an alignment tool provided in the preferred embodiment of the present invention.

Referring now to FIGS. 5–8, additional elements of the tool kit are demonstrated. Referring specifically to FIGS. 6 and 7, an alignment block 50 includes an interior slotted opening 52 adapted to closely receive the body of the flange boss 30. For optimal use of the tool cutter 10, the block 50 should be properly aligned with the boss aperture 32 prior to insertion of the tool cutter 10. The block 50 has a primary aperture 48 defined by axis b—b. Axis b—b is adapted to be pre-aligned with axis a—a of the boss aperture prior to the cutting of the screw thread via the cutter tool 10. Such pre-alignment of the block 50 is facilitated via the use of set screw apertures 54, which extend orthogonally, i.e. radially inwardly, with respect to the primary aperture 48. The screw apertures 54 are adapted to accommodate mating set screws (not shown) which are screwed into and through the apertures to bear against the exterior boss surfaces 34 to secure the block 50 in place.

Referring now to FIG. 5, a special cylindrical locator tool 40 also has an axis c—c adapted for sharing the axis b—b of the block 50. The locator tool 40, which includes a knurled handle 42, has an insert portion 44 adapted to be inserted simultaneously into and through the primary and boss apertures 48 and 32, respectively, as part of the noted pre-alignment procedure to square the latter apertures (at which time the axis c—c becomes coincident with the axis b—b).

Once alignment of the block 50 has been achieved, the block is locked into place on the boss 30 via the set screws. The tap 10 is then installed, cutting end (14) first, into the primary aperture 48 of the block. The front end 58 of the block 50 incorporates a female threaded portion for accommodating both the tapered lead-in portion 20 and the contiguous male cutting thread portion 22 of the tap 10. The pilot end 18 of the tap 10 is inserted through the front end 58 of the block, passing through the boss aperture 32, and extending into the unthreaded pilot portion 60 of the back-end 62 (FIG. 7) of the block. The described block structure provides accurate alignment for the cutting tool 10, thereby assuring that a properly squared thread will be cut into the aperture 32.

One noteworthy aspect of vehicular flanged bosses is that they come in a variety of sizes and shapes. The flexibility of the block 50 of the present invention is that it will accommodate various interior slotted openings 52; i.e. for accommodating different shapes. One example of such flexibility is portrayed by the inclusion of a relief area 64 (FIGS. 6 and 7), which accommodates the irregular protrusion 66 along the control arm boss 30 (FIG. 7).

Another embodiment of a block 50' is shown in FIGS. 8A and 8B. A separate insert 70 incorporates the pilot thread 56' (analogous to the integral female threaded portion 56 of the block 50). In this manner, varying screw profiles may be employed with the use of a single block. Although the preferred screw thread envisioned for use in the aperture 32 (of the vehicular aluminum boss 30 described) is a 10 pitch obtuse thread (to optimize strength of the aluminum thread), this invention will encompass a broad range of screw thread pitches and sizes to handle a broad range of applications.

Figure 9:
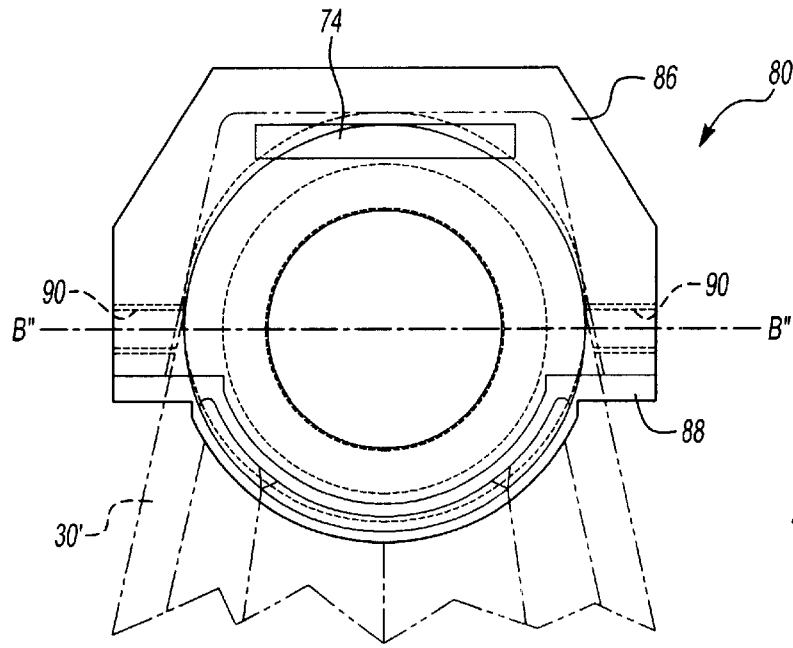
FIG. 9 is a frontal view of yet another embodiment of the alignment tool of the present invention.
Figure 10:
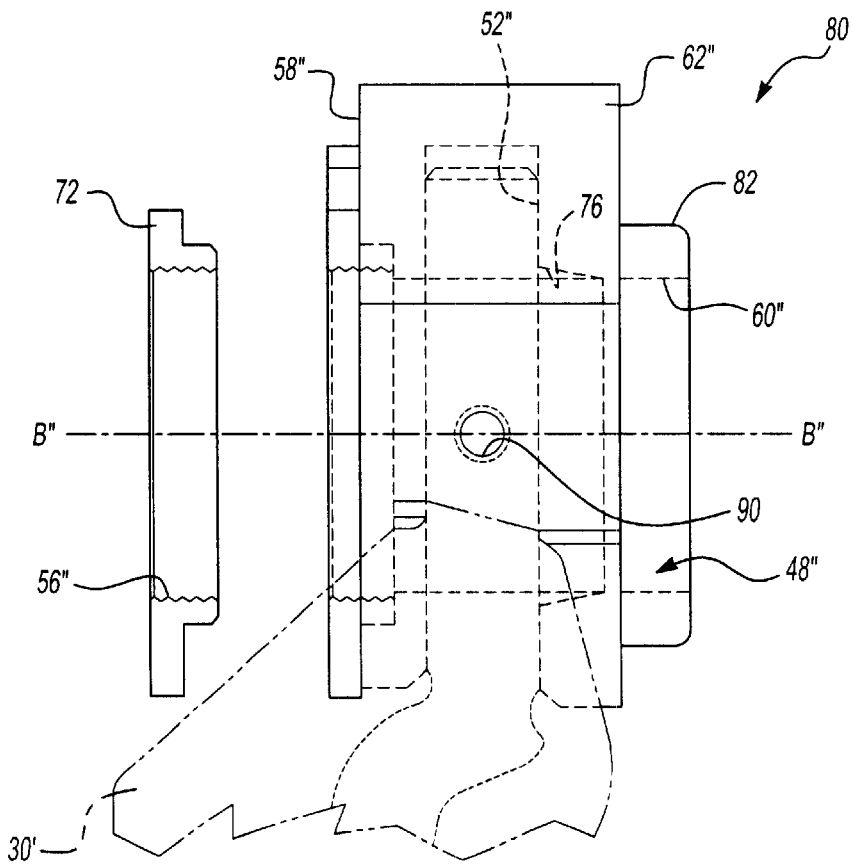
FIG. 10 is a side view of the alignment tool of FIG. 9.

A third embodiment of the alignment block is displayed as element 80 in FIGS. 9 and 10. This embodiment also incorporates a separate insert 72 containing a pilot thread 56", analogous to insert 70 described. The block 80 is multi-piece, and is adapted to accommodate more complex and/or larger boss shapes, such as that exemplified by the boss 30' (FIGS. 9 and 10). The block 80 is formed in two primary pieces, an upper section 86, and a lower section 88, for facilitating the mounting of the block over complex surfaced bosses.

The embodiment 80 contains additional features over the two embodiments of the blocks already described. First, the insert 72 is restrained against undesirable rotation by a separate insert stop ledge 74 positioned at the boundary of the primary aperture 48" at the front end 58" of the block. Secondly, the block 80 contains an extension boss 82, which incorporates an unthreaded female pilot portion 60", analogous to the previously described portions 60. The extension boss provides a means for achieving a desired width of the block 80, with reduced bulk, which for particularly larger block sizes would otherwise make the block relatively cumbersome to handle. Finally, the interior slotted opening 52" incorporates a chamfer 76 to facilitate the entry of the pilot end 18 of the cutting tool 10 into the back-side 62" of the block 80. The latter is particularly helpful where very wide blocks may be required for very large bosses 30'.

Figure 11:
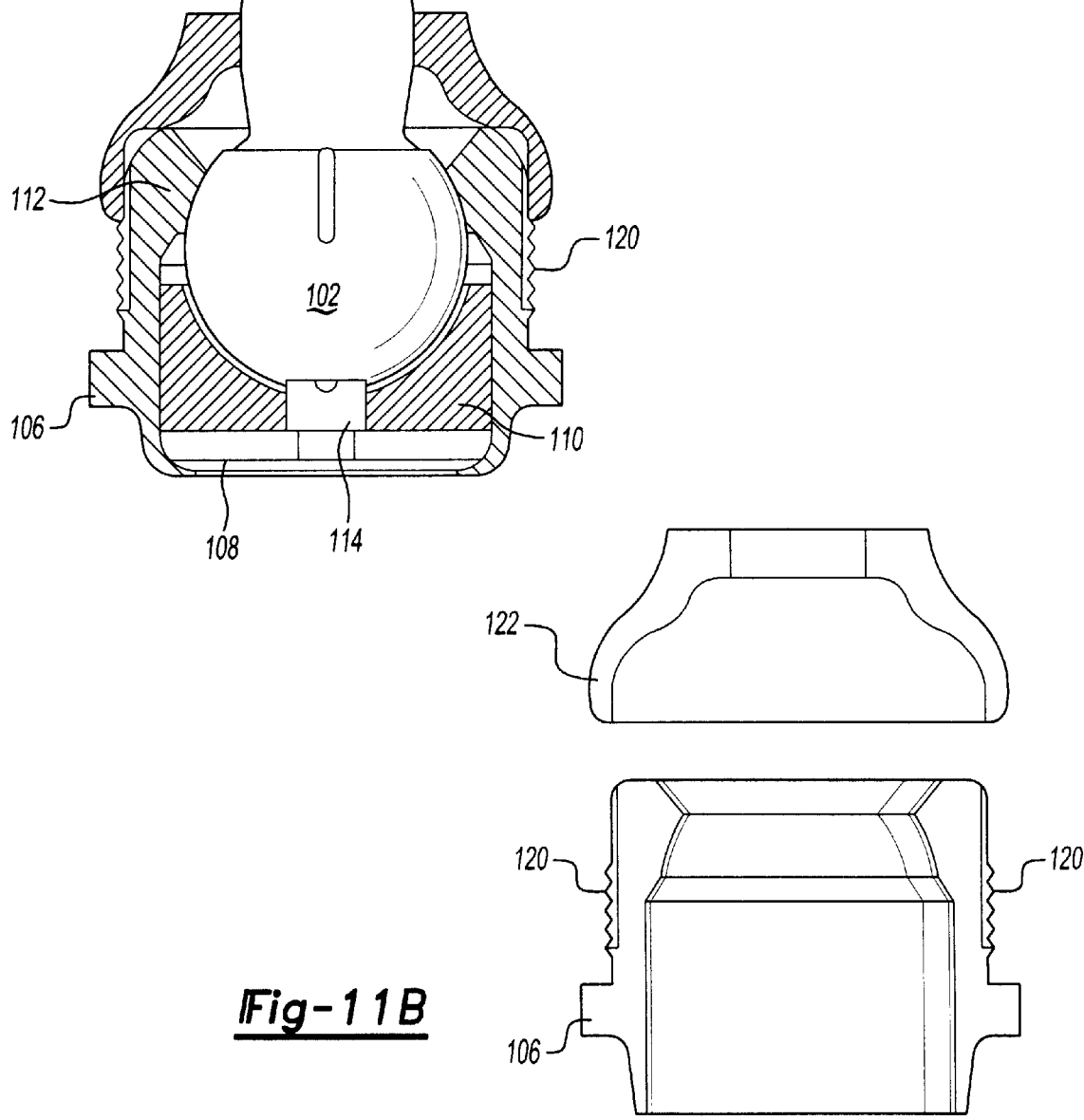
FIG. 11A is a cross-sectional view of a steel ball joint, including a housing with a threaded male connecting portion adapted for being received in an aluminum boss that has been threaded via the kit of the present invention.
in FIG. 11B, two components thereof are shown separately in an exploded view.
Figure 12:
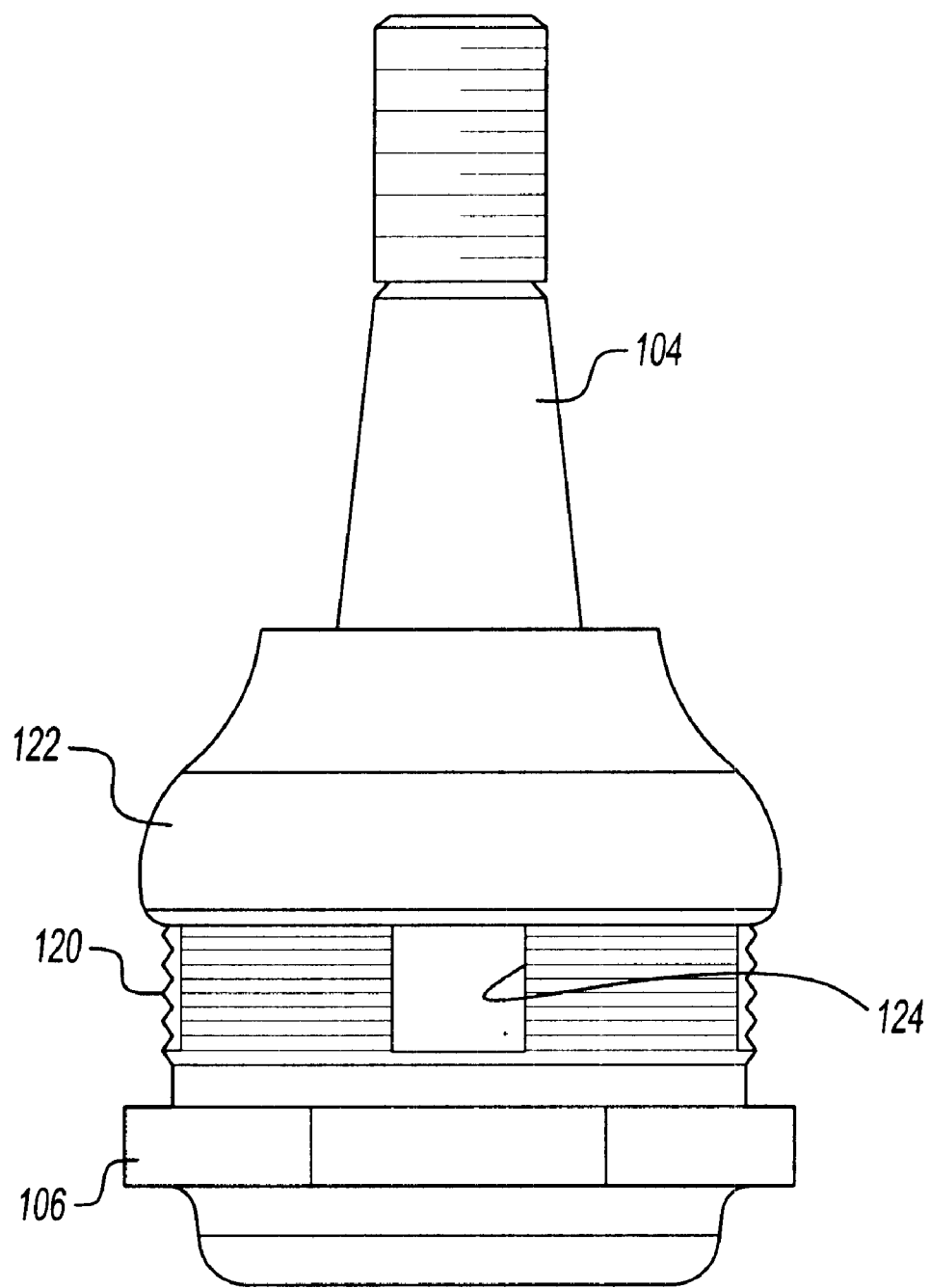
FIG. 12 is an exterior elevation view of the steel ball joint apparatus of FIG. 11A.

FIGS. 11 and 12 depict an end closure-style ball joint 100 adapted for threaded retrofit replacement in accordance with the use of the aforedescribed kit of this invention. The joint 100 includes a ball 102 with an integral stud 104. The ball and stud articulate in a housing 106 and are constrained therein via closure plate 108. An upper bearing seat 110 in conjunction with a lower bearing seat 112 supports the ball end of the joint for movement within the housing 106. A Zerk fitting 114 extends through the closure plate 108 to provide access for lubricant of the ball 102 during useful life of joint 100.

Referring now more particularly to FIGS. 11B and 112, an exterior male threaded portion 120 of the housing 106 is adapted for being mounted into a boss 30 after its aperture 32 has been threaded in accordance with this invention. The threaded portion 120 includes fluted edges 124 for provision of a self-tapping feature as earlier noted. Installation of the ball joint 100 is achieved by installing the stud end first through the aperture 32, then installing an optional dust cover 122 for protection against elements of dirt and moisture. The dust cover is shunned by some racing enthusiasts who tend to regard them as unnecessary weight.

In conclusion, it will be appreciated by those skilled in the art that this invention is a retrofit kit that provides for the convenient aftermarket conversion of a press-fit ball joint attachment system into a threaded ball joint attachment system. The primary parts of the kit are a) the locator tool 40, the alignment block 50, and the tap 10, although in some cases only use of the tap might be required, for example. In addition, the kit could also include replacement ball joints 100 as herein described.

It is to be understood that the above description is intended to be illustrative and not limiting. Many embodiments will be apparent to those skilled in the art upon reading the above description. The scope of the invention should be determined, however, not with reference to the above description, but with reference to the appended claims with full scope of equivalents to which such claims are entitled.

What is claimed is:

1. A tool kit for converting a press-fit ball joint attachment system into a threaded ball joint attachment system, said tool kit comprising:

a) a tap having a first hardness for cutting a screw thread into an aperture having a second, softer, hardness, said tap comprising an elongate cylindrical body having an axis, said tap having a first end adapted for insertion into an unthreaded flange boss aperture, said tap having an unthreaded pilot portion at the extremity of said first end, a tapered lead-in cutting thread portion axially contiguous therewith, and a male cutting thread portion behind said lead-in portion and contiguous therewith; said tap further comprising a second end, said second end comprising apparatus for rotating said tap within said aperture for cutting a screw thread therein; said tap further comprising a stop ring adapted to limit advance of said tool into said aperture, said stop ring positioned intermediate said first and second ends of said tool; and b) an alignment block adapted to receive and to pilot said tap within said boss aperture, said block comprising an interior slotted opening adapted to be positioned over said flange boss, said alignment block further comprising an aperture adapted to be oriented along the axis of said boss aperture, said block aperture adapted to receive said tap wherein the axis of said tap becomes coincident with the axis of said block, and wherein said block aperture has a first end comprising a female threaded portion adapted for mating with said male cutting thread portion of said tap to assure proper alignment of said tap within said boss aperture.

2. The tool kit of claim 1 wherein said alignment block aperture further comprises an unthreaded second end, said unthreaded second end adapted to pilot said first end of said tap during the cutting of said screw thread in said boss aperture.

3. The tool kit of claim 2 wherein said alignment block aperture comprises a primary block aperture, and wherein said alignment block further comprises at least a pair of alignment apertures that extend orthogonally through said block into said primary aperture, said alignment apertures adapted to receive set screws for positioning said block on said flange boss prior to said insertion of said tap.

4. The tool kit of claim 3 further comprising a locator tool including first and second ends; said first end comprising an unthreaded insert portion adapted for simultaneous insertion through said primary aperture in said first end of said alignment block for extension into said boss aperture; said second end comprising a handle portion for facilitating said insertion of said locator tool, wherein said tool is adapted for insertion into said primary aperture after said alignment block has been positioned over said flange boss, said locator tool being inserted for assuring proper alignment between said primary block aperture and said boss aperture prior to tapping said screw thread through said boss aperture via said tap, and wherein said locator tool is adapted for removal upon securement of set screws installed through said alignment apertures of said block and in fixed engagement with said flange boss.

5. The tool kit of claim 4 wherein said tap is formed of a high strength tool steel, and wherein said boss is formed of an aluminum material.

6. The tool kit of claim 5 wherein said apparatus for rotating said tap comprises a socket wrench-receiving member.

7. The tool kit of claim 6 wherein said male cutting thread portion of said first end of said tap comprises apparatus for cutting obtuse threads through said boss aperture.

8. The tool kit of claim 7 wherein said female threaded portion of said first end of said alignment block is incorporated in a separate annular insert that is adapted to be mounted in said first end of said alignment block.

9. The tool kit of claim 8 further comprising a stop ledge positioned at an edge portion of said primary aperture in said first end of said alignment block, wherein said insert is adapted to engage said stop ledge, whereby said insert is restricted from rotation in said block via said stop ledge.

10. The tool kit of claim 9 wherein said apparatus for rotating said tap comprises a hexagonal socket member.

11. A method of converting an unthreaded flange boss aperture into a threaded flange boss aperture for conversion of a press-fit ball joint attachment system into a threaded ball joint attachment system comprising the steps of:

a) providing a tap sized for cutting a screw thread into said unthreaded flange boss aperture;

b) providing an alignment block having an interior slotted opening, said opening adapted to receive and to be positioned over said flange boss, said block comprising a primary aperture adapted for alignment with said boss aperture, and having at least two alignment apertures orthogonally positioned with respect to said primary aperture, and set screws positioned within said alignment apertures;

c) aligning said primary block aperture relative to said flange boss aperture, and fixing said alignment via said set screws;

d) inserting said tap into said primary block aperture and into said boss aperture, and rotating said tap to form said screw thread in said boss aperture.

12. The method of claim 11 further comprising the additional step of providing a locator tool for insertion into said primary aperture for achieving alignment of said primary aperture with said boss aperture prior to fixing said alignment via said set screws.

13. A tool kit for converting a press-fit ball joint attachment system into a threaded ball joint attachment system, said tool kit comprising:

a) means for providing a tap sized for cutting a screw thread into said unthreaded flange boss aperture;

b) means for providing an alignment block having an interior slotted opening, said opening adapted to receive and to be positioned over said flange boss, said block comprising a primary aperture adapted for alignment with said boss aperture, and having at least two alignment apertures orthogonally positioned with respect to said primary aperture, and set screws positioned within said alignment apertures;

c) means for aligning said primary block aperture relative to said flange boss aperture, and fixing said alignment via said set screws;

d) means for inserting said tap into said primary block aperture and into said boss aperture, and rotating said tap to form said screw thread in said boss aperture.

* * * * *